Dec. 4, 1945.   G. E. DATH   2,390,207
FRICTION SHOCK ABSORBING MECHANISM
Filed May 10, 1944
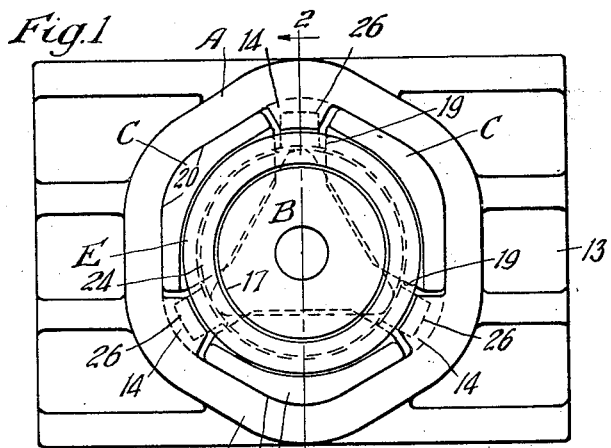
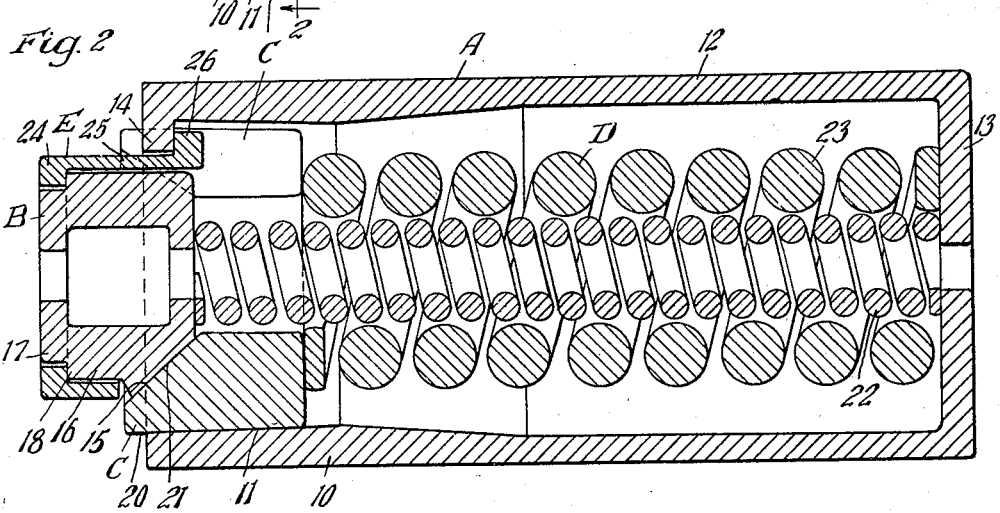
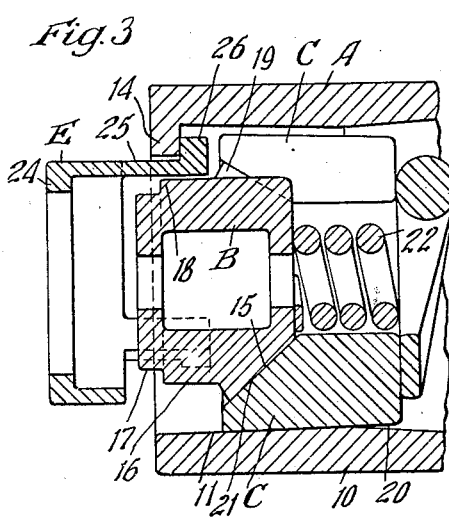
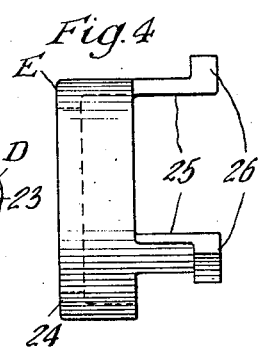
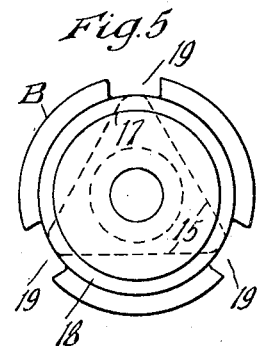
Inventor
George E. Dath
By Henry Fuchs
Atty.

Patented Dec. 4, 1945

2,390,207

UNITED STATES PATENT OFFICE 2,390,207

FRICTION SHOCK ABSORBING MECHANISM

George E. Dath, Mokena, Ill., assignor to W. H. Miner, Inc, Chicago, Ill., a corporation of Delaware Application May 10, 1944, Serial No. 534,909

4 Claims. (Cl. 213—34)

This invention relates to improvements in friction shock absorbing mechanisms.

One object of the invention is to provide a friction shock absorbing mechanism, especially adapted for railway draft riggings, comprising a friction casing, friction shoes slidingly telescoped within the casing, a pressure transmitting wedge block having wedging engagement with the shoes to spread the same apart, and spring means within the casing yieldingly resisting inward movement of the shoes, wherein retaining means is provided for the wedge block, having shouldered engagement with the casing, thereby eliminating the usual retainer bolt employed in this type of shock absorbing mechanism.

A more specific object of the invention is to provide a shock absorbing mechanism as set forth in the preceding paragraph, wherein the retaining means for the wedge is in the form of a tubular sleeve having lugs engaged in back of stop lugs on the casing to limit outward movement of the sleeve, and shouldered engagement with the outer end of the wedge to limit outward movement of the latter.

A further object of the invention is to provide a retaining sleeve of the character set forth, locked against rotation with respect to the casing by having the lugs thereof engaged between adjacent friction shoes of the shock absorbing mechanism, thereby preventing accidental rotary displacement of the lugs of the sleeve with respect to the lugs of the casing.

Other objects of the invention will more clearly appear from the description and claims hereinafter following.

In the drawing forming a part of this specification, Figure 1 is a front elevational view of my improved friction shock absorbing mechanism. Figure 2 is a longitudinal, vertical sectional view, corresponding substantially to the line 2—2 of Figure 1. Figure 3 is a view similar to Figure 2, of the front end portion only of the mechanism, illustrating the manner of assembling the parts thereof. Figure 4 is a side elevational view of the locking sleeve of my improved mechanism. Figure 5 is a front elevational view of the wedge block.

As shown in said drawing, my improved friction shock absorbing mechanism comprises broadly a combined friction shell and spring cage casing A; a wedge block B; three friction shoes C—C—C; a spring resistance D; and a retaining sleeve E.

The casing A, as shown, is of hexagonal cross section having a friction shell proper 10 at its outer end, the latter being provided with interior friction surfaces 11—11—11, arranged symmetrically with respect to the axis of the shell, thereby presenting a friction shell of hexagonal interior cross section. The three friction surfaces 11—11—11 converge inwardly of the casing and are of V-shaped transverse cross section. Rearwardly of the shell proper, the casing A is formed with a spring cage portion 12, and at its rear end with an integral, transverse vertical wall 13, the latter being suitably laterally extended and reenforced to adapt it to function as the rear follower of the mechanism. The casing A is open at its front end and is provided with three inturned stop lugs 14—14—14 at said open end. The lugs 14—14—14 are alternated with and disposed between the respective friction surfaces 11—11—11 of the casing.

The wedge B, which is in the form of a hollow block, has a transverse flat front end face adapted to bear on the usual front follower of the railway draft rigging. At the inner end portion thereof, the block B is provided with three flat wedge faces 15—15—15 arranged symmetrically about the longitudinal central axis of the wedge. The three faces 15—15—15 converge inwardly or rearwardly of the mechanism. Outwardly of the wedge faces, the block B is of cylindrical cross section and of reduced size, thereby providing a cylindrical portion 16. At the outer end the cylindrical portion 16 is reduced in diameter, as indicated at 17, thereby providing an annular stop shoulder 18 at the front end of said block. Between the wedge faces thereof, the cylindrical portion 16 of the block B is provided with longitudinally extending, exterior slots 19—19—19 which continue through the inner end portion or wedge end of the block.

The shoes C—C—C are of similar design, each shoe having an outer, longitudinally extending, V-shaped friction surface 20 formed by two adjacent, angularly disposed faces. The friction surfaces 20—20—20 of the three shoes are correspondingly inclined to, and slidingly engaged with, the V-shaped friction surfaces 11—11—11 of the casing. On the inner side, at the front end thereof, each shoe C has a flat wedge face 21 engaging with one of the wedge faces 15 of the block B and correspondingly inclined thereto.

The spring D, as shown, comprises inner and outer coils 22 and 23 bearing at their rear ends on the wall 13 of the casing A. The inner coil 22 bears at its front end on the inner end of the wedge B and the outer coil 23 bears at its front end on the inner ends of the shoes C—C—C.

The spring resistance D is preferably under initial compression.

The retaining sleeve E is in the form of a tubular, cylindrical collar having a heavy, inturned, annular flange 24 at its front or outer end, and three rearwardly projecting arms or fingers 25—25—25 which extend from the side wall of the sleeve. Each arm 25 is provided with a heavy, laterally outwardly projecting retaining lug 26 at its rear end. The sleeve E fits over the cylindrical portion 16 of the wedge block B with the arms thereof extending through the slots 19—19—19 of said block and the three lugs 26—26—26 of said arms engaged in back of the lugs 14—14—14 of the casing to limit outward movement of the sleeve. The inturned flange 24 of the sleeve E overhangs the shoulder 18 of the wedge block B, as shown most clearly in Figure 2, thereby limiting outward movement of the wedge. As will be evident, the sleeve thus anchors the wedge to the casing and holds the mechanism assembled. The flange 24 is of the same depth as the reduced cylindrical portion 17 of the block B and the sleeve has its outer end face flush with the outer end of the wedge block.

In assembling the mechanism, the spring resistance D, the shoes C—C—C, and the wedge block B are first placed within the casing A. The wedge block is then forced inwardly to the approximate position shown in Figure 3, any suitable tool being used for this purpose. The tool employed is preferably in the form of a bar and the same is engaged through the opening of the sleeve E. As will be understood, at the time the mechanism is thus compressed, the sleeve E has been placed around the bar to facilitate assembling of the same with the casing. After the mechanism has been compressed, as shown in Figure 3, the sleeve is engaged within the open end of the casing A over the wedge block B and forced inwardly until the lugs 26 thereof are disposed inwardly or in back of the lugs 14 of the casing. As will be evident, in order to by-pass the lugs 14 of the casing, the sleeve is displaced rotatively to offset the lugs 26 with respect to the lugs 14. After the retaining sleeve E has been disposed with the lugs thereof rearwardly of the lugs of the casing, the same is given a slight rotation to locate the lugs 26 in back of the lugs 14. The pressure is then removed from the wedge, thereby permitting the spring D to force the shoes and wedge outwardly to the position shown in Figure 2. As will be seen upon reference to Figures 1 and 2, the arms 25 of the sleeve E being disposed between adjacent shoes effectively prevent relative rotation of the sleeve and shoes, and the shoes, in turn, are held against rotation with respect to the casing A by the interlocking arrangement of the cooperating V-shaped friction surfaces of the casing and shoes. Outward movement of the sleeve E is positively limited by engagement of the lugs 26 thereof with the lugs 14 of the casing and outward movement of the wedge block B is, in turn, limited by the shouldered engagement of the flange 24 of the sleeve with the shoulder 18 of said block.

The operation of my improved shock absorbing mechanism is as follows: Upon inward movement of the wedge B with respect to the casing A being produced, due to compression of the mechanism, the spring resisted friction shoes are spread apart and carried inwardly of the casing, compressing the spring D, the outer coil being compressed between the shoes and rear end of the casing and the inner coil between the wedge and said rear end of the casing. High frictional resistance is thus produced between the friction surfaces of the shoes and casing. Upon the actuating force being reduced, the expansive action of the spring D returns all of the parts to the normal full release position shown in Figure 1, the wedge being limited in its outward movement by shouldered engagement with the sleeve E which, in turn, has its outward movement limited by shouldered engagement of the lugs thereof with the stop lugs at the outer end of the casing.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a casing open at its front end; of a plurality of friction shoes slidingly telescoped within the casing; a central wedge block having wedging engagement with the shoes; spring means within the casing opposing inward movement of the wedge and shoes; and a retaining sleeve engaged over the outer end of the wedge and having shouldered engagement therewith to limit outward movement of the same, said sleeve having rearwardly extending arms engaged between adjacent shoes, said arms having lugs at the inner ends thereof in shouldered engagement with the interior of the casing to limit outward movement of said sleeve.

2. In a friction shock absorbing mechanism, the combination with a casing open at its front end and having inturned stop lugs at said open end; of three friction shoes slidingly telescoped within said open end of the casing; a central wedge block having wedging engagement with the shoes; spring means within the casing opposing inward movement of the wedge and shoes; and a retaining sleeve engaged over the outer end of the wedge and having shouldered engagement therewith to limit outward movement of said wedge with respect to the sleeve, said sleeve having rearwardly projecting arms engaged between adjacent shoes, said arms having outturned lugs at their inner ends engaged in back of the lugs of the casing to limit outward movement of the sleeve.

3. In a friction shock absorbing mechanism, the combination with a casing open at one end and having longitudinally extending friction surfaces at said open end of V-shaped transverse section; of laterally inwardly projecting stop lugs at said open end of the casing, said lugs being alternated with the V-shaped friction surfaces of the casing; a friction shoe slidingly engaged with each V-shaped friction surface of the casing, said shoe having a wedge face on the inner side; a central wedge block having wedge faces engaged with the wedge faces of said shoes respectively; a retainer sleeve engaged over the outer end of said wedge block, said sleeve having an inturned flange at the outer end thereof overhanging the end of the wedge and in shouldered engagement therewith; and rearwardly extending arms on said sleeve, said arms being engaged between adjacent shoes and having outturned stop lugs at their rear ends engaged in back of the lugs of the casing to limit outward movement of said sleeve.

4. In a friction shock absorbing mechanism, the combination with a casing open at one end and having longitudinally extending friction surfaces at said open end of V-shaped transverse section; of laterally inwardly projecting stop lugs at said open end of the casing, said lugs being alternated with the V-shaped friction surfaces of the casing; a friction shoe slidingly engaged with each V-shaped friction surface of the casing, said shoe having a wedge face on the inner side; a central wedge block having wedge faces at the inner end engaged with the wedge faces of the shoes, said block having a cylindrical outer end portion; a cylindrical retaining sleeve telescoped over said cylindrical outer end portion of the block, said sleeve having an annular inturned flange at its outer end in shouldered engagement with the outer end of said cylindrical portion of said block; and rearwardly extending arms on said sleeve, said arms being engaged between adjacent shoes and having outturned stop lugs at their rear ends engaged in back of the lugs of the casing to limit outward movement of said sleeve.

GEORGE E. DATH.